US012345206B2

(12) United States Patent
Czapla et al.

(10) Patent No.: US 12,345,206 B2
(45) Date of Patent: Jul. 1, 2025

(54) PROPULSION ASSEMBLY FOR AN AIRCRAFT

(71) Applicant: Airbus Operations SAS, Toulouse (FR)

(72) Inventors: Lionel Czapla, Toulouse (FR); Rémi Amargier, Toulouse (FR)

(73) Assignee: Airbus Operations SAS, Toulouse (FR)

(*) Notice: Subject to any disclaimer, the term of this patent is extended or adjusted under 35 U.S.C. 154(b) by 0 days.

(21) Appl. No.: 18/772,636

(22) Filed: Jul. 15, 2024

(65) Prior Publication Data
US 2025/0027452 A1   Jan. 23, 2025

(30) Foreign Application Priority Data
Jul. 20, 2023   (FR) ..................................... 2307812

(51) Int. Cl.
| F02C 7/25 | (2006.01) |
| B64D 29/08 | (2006.01) |
| B64D 37/30 | (2006.01) |
| B64D 37/32 | (2006.01) |

(52) U.S. Cl.
CPC ................ F02C 7/25 (2013.01); B64D 29/08 (2013.01); B64D 37/30 (2013.01); B64D 37/32 (2013.01)

(58) Field of Classification Search
CPC ... F02C 7/25; F02C 7/28; F02K 1/822; B64D 2045/009; B64D 29/08
See application file for complete search history.

(56) References Cited

U.S. PATENT DOCUMENTS

| 4,062,184 A | 12/1977 | Hagen |
| 5,458,343 A * | 10/1995 | Dornfeld ............... F01D 11/003 277/606 |
| 9,976,484 B2 | 5/2018 | Sawyers-Abbott |
| 2011/0214405 A1 | 9/2011 | Joret et al. |
| 2020/0130811 A1* | 4/2020 | Crawford .................. B64C 7/02 |
| 2022/0055756 A1* | 2/2022 | Basse ........................ F02C 7/20 |

(Continued)

FOREIGN PATENT DOCUMENTS

| EP | 3653268 A1 * | 5/2020 |
| EP | 4015395 A1 | 6/2022 |

(Continued)

OTHER PUBLICATIONS

English translation of EP 3653268 (Year: 2020).*
French Search Report for corresponding French Patent Application No. 2307812 dated Nov. 28, 2023.

*Primary Examiner* — Thomas P Burke
(74) *Attorney, Agent, or Firm* — Greer, Burns & Crain, Ltd.

(57) ABSTRACT

A propulsion assembly having a combustion chamber and a turbine, a nacelle with a front cowl facing the turbine, with a window passing through it, and a rear cowl to the rear of the turbine, a fire barrier between the front cowl and the rear cowl, a dihydrogen supply pipe meandering from the inside of the rear cowl, then in a sealed manner through the fire barrier, then through the window as far as the combustion chamber, wherein the supply pipe has an intermediate section between the fire barrier and the window, and a plate fastened in a sealed manner to the intermediate section and fastened in a sealed manner to the front cowl around the window.

9 Claims, 2 Drawing Sheets

(56) References Cited

U.S. PATENT DOCUMENTS

2022/0185495 A1 6/2022 Calderon Gomez et al.
2023/0043843 A1 2/2023 Pissavin et al.

FOREIGN PATENT DOCUMENTS

| EP | 4129827 A1 | 2/2023 |
| FR | 2938238 A1 | 5/2010 |
| GB | 1499205 A | 1/1978 |

* cited by examiner

PROPULSION ASSEMBLY FOR AN AIRCRAFT

CROSS-REFERENCES TO RELATED APPLICATIONS

This application claims the benefit of French Patent Application Number 2307812 filed on Jul. 20, 2023, the entire disclosure of which is incorporated herein by way of reference.

FIELD OF THE INVENTION

The present invention relates to a propulsion assembly for an aircraft, said propulsion assembly comprising a nacelle, a propulsion system such as a turboprop engine housed in the nacelle and a set of pipes arranged to supply the propulsion system with dihydrogen from a dihydrogen tank. The invention also relates to an aircraft having at least one such propulsion assembly.

BACKGROUND OF THE INVENTION

In order to move, an aircraft conventionally has at least one propulsion assembly comprising a propulsion system such as a turboprop engine. Such a propulsion system has a core that is enclosed in a casing and that has, inter alia, from upstream to downstream, a compressor, a combustion chamber and a turbine. The casing is housed in a nacelle. The propulsion system also has a propeller driven in rotation by the core. The compressor and the turbine each have blades that are fastened to a rotary shaft.

The propulsion assembly also has a chassis that is fastened to a structure of the wing of the aircraft and thus constitutes an attachment pylon beneath the wing.

In order to limit pollution due to the use of kerosene, using dihydrogen as fuel in the combustion chamber is envisaged.

This dihydrogen is brought from a tank to the combustion chamber by a dihydrogen pipe that extends at least partially in the propulsion assembly. As a result of the structure of the propulsion assembly and its position beneath the wing and on the front of the wing, the dihydrogen pipe passes through the chassis, coming from the wing, and thus runs from the rear to the front as far as the combustion chamber.

In the solution envisaged, the dihydrogen pipe runs outside the casing so as to reach the combustion chamber through the casing.

In the event of an incident on the propulsion system, in particular in the event of an uncontained engine rotor failure (UERF), some blades of the turbine or of the compressor may be detached from the shaft and, as a result of their speed, pass through the casing, at the risk of cutting the dihydrogen pipe. In such a situation, in order to limit a risk of fire or explosion, there should be no risk of dihydrogen from the pipe accumulating inside the nacelle.

SUMMARY OF THE INVENTION

An object of the present invention is to propose a propulsion assembly that has a dihydrogen supply pipe of which an intermediate section is disposed around the turbine that meanders around the nacelle, wherein the intermediate section has a specific architecture that makes it possible to ensure the sealing against dihydrogen between the inside and the outside of the nacelle.

To that end, a propulsion assembly for an aircraft is proposed, having:

a propulsion system having a core enclosed in a casing and having a combustion chamber and a turbine provided with blades that rotate about a longitudinal axis, a nacelle in which the propulsion system is housed, comprising cowls including a front cowl extending facing and in front of the turbine, with a window passing through it that is disposed at the front of the turbine, and a rear cowl extending to the rear of the turbine, a fire barrier that extends between the front cowl and the rear cowl, a supply pipe intended to convey dihydrogen, meandering inside the rear cowl as far as the rear of the turbine, then in a sealed manner through the fire barrier so as to reach the outside of the front cowl, then through said window as far as the combustion chamber, wherein the supply pipe is constituted of a plurality of sections that are fastened to one another and wherein an intermediate section extends from downstream of the fire barrier to downstream of the window, and a plate fastened in a sealed manner to the intermediate section and fastened to the front cowl, so as to seal said window.

With such an arrangement, the intermediate section is outside the nacelle and, if it is impacted by a blade shard, the dihydrogen from the leak spreads outside the nacelle and is evacuated toward the outside. Furthermore, in the event of a leak in the intermediate section outside the nacelle, the sealed setup proposed here ensures that the dihydrogen does not spread inside the nacelle.

Advantageously, the fire barrier extends transversely with respect to the longitudinal axis of the propulsion system.

Advantageously, the fire barrier extends inside the front cowl and separates the nacelle into a front zone and a rear zone that are sealed with respect to one another.

Advantageously, the propulsion assembly has an outer cowl fastened to the outside of the front cowl of the nacelle, surrounding the part of the supply pipe that is between the fire barrier and the window, and the propulsion assembly has an air inlet at the front of the outer cowl, between the latter and the front cowl of the nacelle, and an outlet at the rear of the outer cowl, between the latter and the cowls of the nacelle.

Advantageously, the outlet is in front of said fire barrier.

Advantageously, the outlet is located at a top part of the outer cowl.

Advantageously, the propulsion assembly has a sealed flange having a shoe secured to the fire barrier and having a first seat forming a half-cylinder and an extension having a second seat forming a half-cylinder, securing means that fasten the extension to the shoe such that the seats adjoin one another so as to form a cylinder, and a cylindrical seal housed in said cylinder and through which the supply pipe passes.

Advantageously, the propulsion assembly has a hatch removably mounted on a cowl.

The invention also proposes an aircraft having a dihydrogen tank and at least one propulsion assembly according to one of the preceding variants, wherein the supply pipe is fluidically connected to the dihydrogen tank.

BRIEF DESCRIPTION OF THE DRAWINGS

The above-mentioned features of the invention, along with others, will become more clearly apparent upon reading the following description of one exemplary embodiment, said description being given with reference to the appended drawings, in which.

DETAILED DESCRIPTION OF THE PREFERRED EMBODIMENTS

Figure 1:
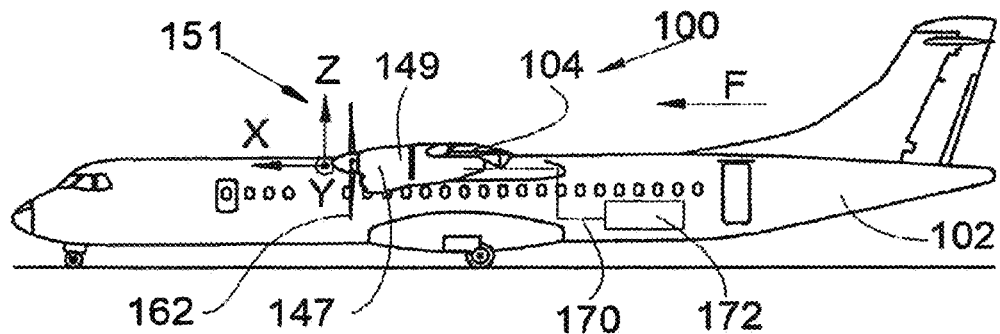
FIG. 1 is a side view of an aircraft having a propulsion assembly according to the invention.

In the following description, terms relating to a position are considered in relation to an aircraft in a position of forward movement, i.e. as shown in FIG. 1 in which the arrow F shows the direction of forward movement of the aircraft.

In the following description, and by convention, X denotes the longitudinal axis of the propulsion system, which is parallel to the longitudinal axis of the aircraft oriented positively toward the front in the direction of forward movement of the aircraft, Y denotes the transverse axis, which is horizontal when the aircraft is on the ground, and Z denotes the vertical axis or vertical height when the aircraft is on the ground, these three axes X, Y and Z being mutually orthogonal.

FIG. 1 shows an aircraft 100 that has a fuselage 102 on either side of which is fastened a wing 104. Beneath each wing 104 is fastened at least one propulsion assembly 151 according to the invention, which has a nacelle 149 constituted of cowls 147 forming an aerodynamic outer surface.

Figure 2:
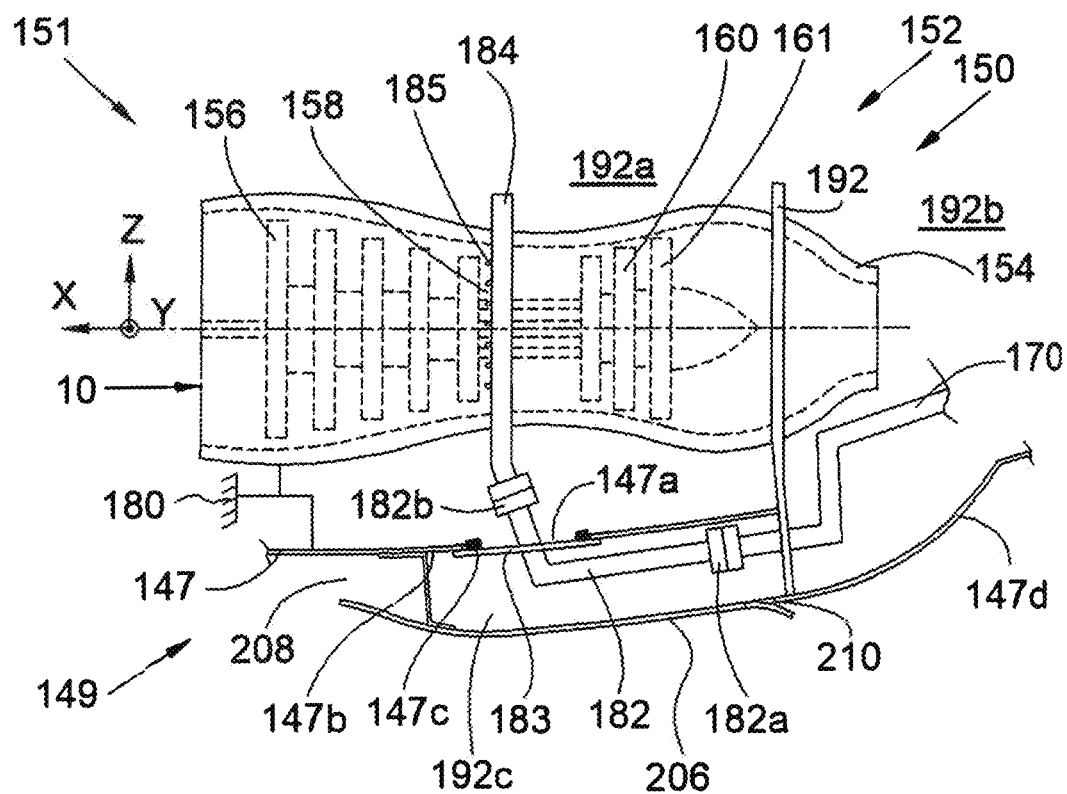
FIG. 2 is a schematic depiction, viewed from above, of the propulsion assembly according to the invention.

FIG. 2 shows the propulsion assembly 151, which also has a propulsion system 150 that is depicted schematically. The propulsion assembly 151 has a chassis 180 that fastens the propulsion assembly 151 to a structure of the wing 104 and constitutes an attachment pylon. The chassis 180 is fastened to the structure of the wing by fastening means known to those skilled in the art. The chassis 180 and the propulsion system 150 are housed inside the nacelle 149.

In the embodiment of the invention that is presented in FIG. 2, the propulsion system 150 is a turboprop engine that has a core 152 that is enclosed in a casing 154. In the embodiment of the invention that is presented in FIG. 2, the casing 154 is housed inside the nacelle 149 and it is fastened thereto by any suitable means known to those skilled in the art.

Outside air enters the nacelle 149 through an opening provided in the cowls 147 at the front of the nacelle 149, which is furthermore fastened to the chassis 180 by suitable fastening means known to those skilled in the art.

Inside the nacelle 149, the primary air flow 10 enters the core 152 so as to supply a combustion chamber 158 of the propulsion system 150 with dioxygen.

The casing 154 is thus open at the front so as to allow the introduction of the primary flow 10 into the core 152 and open at the rear so as to allow the gases resulting from the combustion to escape through a nozzle. The core 152 has, from upstream to downstream, a compressor 156, the combustion chamber 158 and a turbine 160. The compressor 156 and the turbine 160 are provided with blades 161 that rotate about the longitudinal axis X.

The primary flow 10 thus passes successively through the compressor 156 where it is compressed before being injected into the combustion chamber 158 where it is mixed with the fuel. The gases resulting from the combustion then pass through the turbine 160 and drive it in rotation. The turbine 160 then in turn drives the compressor 156 in rotation and the gases are then ejected at the rear.

In the case of a turboprop engine, the propulsion system 150 has a propeller 162 that is at the front and driven in rotation by the turbine 160, possibly via a gearbox. The propeller 162 rotates about a rotation axis parallel to the longitudinal axis X and potentially offset with respect thereto.

The propulsion assembly 151 also has a supply pipe 170 fluidically connected to a dihydrogen tank 172 of the aircraft 100 so as to convey the dihydrogen to the combustion chamber 158. The supply pipe 170 thus meanders inside the nacelle 149, from the rear of the nacelle 149 outside the casing 154 as far as the rear of the turbine 160.

The propulsion assembly 151 also has an injector rail 184 that is fluidically connected to the supply pipe 170 and that is housed in the nacelle 149. The injector rail 184 is arranged in this case around the casing 154 and the combustion chamber 158. The injector rail 184 is equipped with injectors 185 that drop into the combustion chamber 158 at the front of the turbine 160, in this case through the casing 154.

The nacelle 149 has a front cowl 147b that extends on the side facing and in front of the turbine 160. The front cowl 147b has a window 147a passing through it that is disposed at the front of the turbine 160.

The nacelle 149 also has a rear cowl 147d that extends to the rear of the turbine 160.

In the embodiment of the invention that is presented in FIG. 2, the front cowl 147b is closer to the casing 154 than the rear cowl 147d is, the latter therefore being on the outside with respect to the front cowl 147b.

The propulsion assembly 151 also has a fire barrier 192 constituted of a material that is resistant to high temperatures. The fire barrier 192 extends between the front cowl 147b and the rear cowl 147d and thus ensures the junction between them. The fire barrier 192 therefore separates the space into a rear zone 192b that is behind the fire barrier 192 and inside the rear cowl 147d, and a lateral zone 192c that is in front of the fire barrier 192 and outside the front cowl 147b.

The space also has a front zone 192a that is in front of the fire barrier 192 and inside the front cowl 147b.

The supply pipe 170 is housed in the rear zone 192b, i.e. inside the rear cowl 147d as far as the rear of the turbine 160. The supply pipe 170 then passes in a sealed manner through the fire barrier 192 so as to meander in the lateral zone 192c, i.e. outside the front cowl 147b, and finally pass through the window 147a so as to reach the combustion chamber 158 through the injector rail 184 and the injectors 185.

The supply pipe 170 is constituted of a plurality of sections 182 that are fastened in the continuation of one another and an intermediate section 182 extends from downstream of the fire barrier 192 to downstream of the window 147a with respect to the direction of the flow of the dihydrogen in the supply pipe 170.

The intermediate section 182 thus has a first end 182a that is fluidically connected to the part of the supply pipe 170 coming from the tank 172, and a second end 182b that is fluidically connected to the part of the supply pipe 170 reaching the combustion chamber 158. In order to fasten each end 182a-b to the corresponding part of the supply pipe 170, each end and each part have a fastening flange intended to be secured to the fastening flange of the associated element.

As a result of the construction of the propulsion assembly 151, the first end 182a is thus outside the nacelle 149, and more particularly outside the front cowl 147b, and the second end 182*b* is thus inside the nacelle 149, and more particularly inside the front cowl 147*b*.

The dimensions of the window 147*a* are sufficient to allow said second end 182*b* to pass through. The second end 182*b* is therefore connected to the corresponding part of the supply pipe 170 through the window 147*a*.

The propulsion assembly 151 also has a plate 183 that is fastened to the intermediate section 182, forming in this case a collar around said intermediate section 182. In this case, the fastening is sealed so as to prevent the passage of the dihydrogen between the plate 183 and the intermediate section 182, as explained below. The fastening is realized for example by welding.

The plate 183 is furthermore fastened in a sealed manner to the front cowl 147*b*, closing off the window 147*a* so as to seal it as well. The plate 183 is thus fastened around the window 147*a*. The fastening of the plate 183 to the front cowl 147*b* is preferably removable, for example with the aid of threaded fasteners, so as to ensure the removal of the intermediate section 182 if necessary.

With such an arrangement, if debris from a blade 161 passes through the casing 154 and the cowls 147, damaging the supply pipe 170 in the lateral zone 192*c*, the dihydrogen escaping from the latter is evacuated toward the outside. If a leak occurs at the part of the supply pipe 170 that is outside the nacelle 149, the sealing of the fastening of the supply pipe 170 to the plate 183 and the sealing of the fastening of the plate 183 to the front cowl 147*b* prevents the flow of the dihydrogen toward the inside of the nacelle 149. In the same way, the sealed passage of the supply pipe 170 through the fire barrier 192 prevents the flow of the dihydrogen toward the lateral zone 192*c*. Given that the window 147*a* is situated at the front of the turbine 160 and the fire barrier 192 is situated at the rear of the turbine 160, the part of the supply pipe 170, and therefore of the intermediate section 182, running facing the turbine 160 is situated outside the front cowl 147*b* and therefore outside the nacelle 149. Consequently, in the event of debris being projected from the turbine 160, it can only reach the supply pipe 170 and the intermediate section 182 in said part situated outside the nacelle 149 and in the lateral zone 192*c*. Since there is no supply pipe inside the nacelle 149 on the sides of turbine 160, there is no risk of it being impacted by debris, and this makes it possible to avoid a dihydrogen leak inside the nacelle 149. This makes it possible to protect the nacelle 149 against a risk of fire or explosion.

In the embodiment of the invention that is presented in FIG. 2, the fire barrier 192 extends transversely with respect to the longitudinal axis X and in this case the fire barrier 192 extends inside the front cowl 147*b* and separates the nacelle 149 into the front zone 192*a* and the rear zone 192*b*, which are then sealed with respect to one another.

The fire barrier 192 extends in this case around the casing 154.

Thus, any fire that starts in one or other of the zones 192*a-c* remains confined in this zone without propagating to the neighboring zone. In particular, a fire that starts in the front zone 192*a* containing the combustion chamber 158 cannot propagate into one of the zones 192*b* or 192*c* through which the dihydrogen supply pipe 170, 182 runs.

In the embodiment of the invention that is presented in FIG. 2, the intermediate section 182 extends along the turbine 160 between the rear of the turbine 160 and the front of the turbine 160 and, for at least a part, outside the front cowl 147*b* of the nacelle 149.

At the passage through the fire barrier 192 and the front cowl 147*b*, the supply pipe 170 is generally perpendicular to the fire barrier 192 and to the front cowl 147*b* respectively in order to make the placement of the seal easier.

According to one particular embodiment, the intermediate section 182 is disposed in the top part of the nacelle 149 and above the propulsion system 150 for better evacuation of the dihydrogen in the event of a leak.

In the embodiment of the invention that is presented in FIG. 2, the plate 183 is fastened against the outer face of the front cowl 147*b*, i.e. the face oriented toward the outside of the nacelle 149. The dimensions of the plate 183 are therefore in this case such that the plate 183 cannot pass through the window 147*a*.

The plate 183 can take any of the shapes that can be envisaged as a function of the shape of the window 147*a*. It can thus be circular, rectangular, etc.

In one particular embodiment, the supply pipe 170 and the injection rail 184 are double-skinned pipes so as to secure the flow of the dihydrogen, and the fastening flanges between each of them are adapted to such double-skinned pipes.

In order to seal the fastening between the plate 183 and the front cowl 147*b*, seals 147*c*, in particular seals that are resistant to high temperatures, are placed between the plate 183 and the front cowl 147*b*.

In the embodiment that is presented in FIG. 2, in order to improve the aerodynamics of the propulsion assembly 151, the latter has an outer cowl 206 fastened to the outside of the cowls 147 of the nacelle 149 and more particularly of the front cowl 147*b*, surrounding the part of the supply pipe 170 that is between the fire barrier 192 and the window 147*a*, i.e. at least in part the intermediate section 182. The outer cowl 206 thus extends the rear cowl 147*d* toward the front.

The propulsion assembly 151 then has an air inlet 208 at the front of the outer cowl 206, between the latter and the front cowl 147*b* of the nacelle 149, and an outlet 210 at the rear of the outer cowl 206, between the latter and the cowls 147 of the nacelle 149. Thus, the outside air that enters via the air inlet 208 will drive any dihydrogen toward the air outlet 210 in the event of a leak.

In order to prevent the dihydrogen from propagating into the rear zone 192*b* in the event of a leak in the lateral zone 192*c*, the outlet 210 is in front of the fire barrier 192.

According to one particular embodiment, the outlet 210 is located at a top part of the outer cowl 206 for better evacuation of the dihydrogen in the event of a leak.

Figure 3:
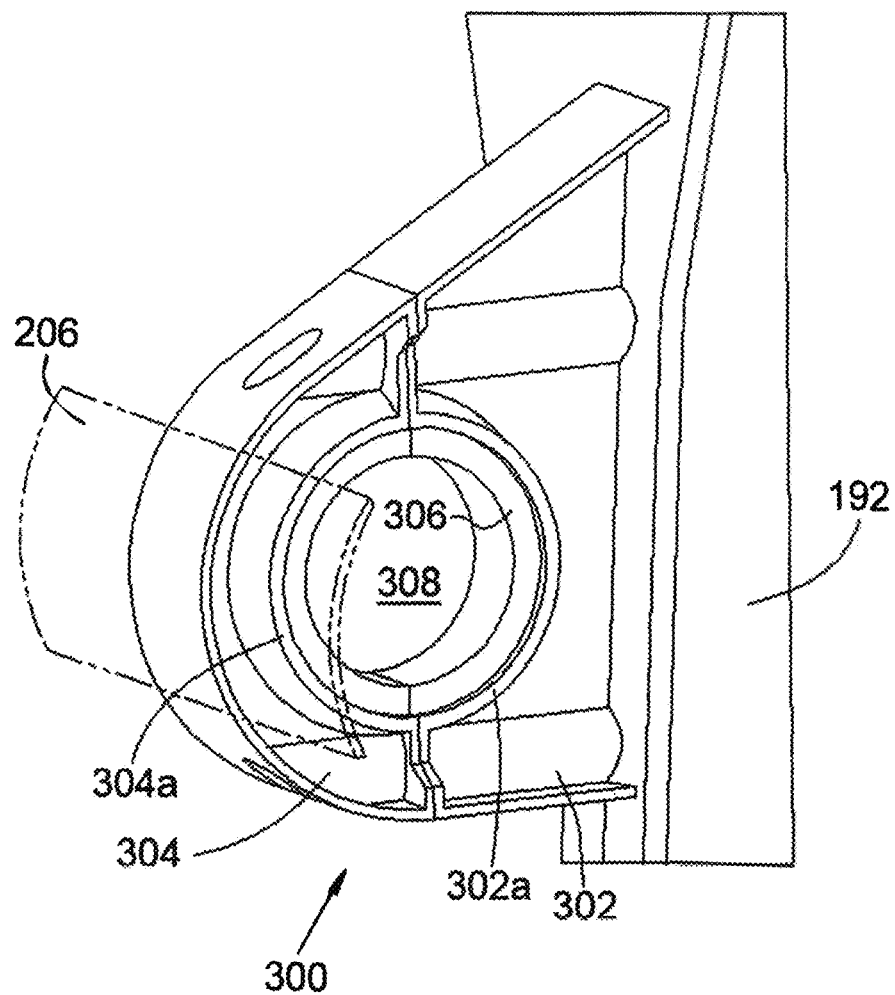
FIG. 3 is a perspective view of a flange implemented in the propulsion assembly according to the invention.

FIG. 3 shows an example of a sealed flange 300 implemented to ensure the passage of the supply pipe 170 through the fire barrier 192.

The sealed flange 300 has a shoe 302 that is secured to the fire barrier 192, for example by welding, which has a first seat 302*a* that forms a half-cylinder.

The sealed flange 300 also has an extension 304 that has a second seat 304*a* also forming a half-cylinder. The extension 304 bears in a sealed manner against the outer cowl 206.

In the assembled position, the two half-cylinders adjoin one another so as to form a cylinder.

The sealed flange 300 also has securing means, such as screws, which fasten the extension 304 to the shoe 302 in the assembled position.

The sealed flange 300 also has a seal 306 that is also of cylindrical shape and that is housed in the cylinder constituted by the shoe 302 and the extension 304. The seal 306 also has a central bore 308 through which the supply pipe 170 passes in a sealed manner.

In the embodiment of the invention that is presented in FIG. 3, the seal 306 is constituted of two half-cylinder elements, and this makes the placement around the supply pipe 170 easier. These elements are chosen so as to resist fire.

For maintenance reasons, for example to replace the intermediate section 182, it is necessary to access the second end 182*b* in order to separate it from the part of the supply pipe 170 that is downstream. To this end, according to one particular embodiment of the invention, one of the cowls 147 is equipped with a hatch that is removably mounted on said cowl 147.

The hatch may be mounted articulated between an open position and a closed position. The hatch is positioned such that a technician has access to the second end 182*b* when the hatch is in the open position.

Conventionally, according to one particular embodiment, the hatch is equipped with hinges and with a lock that allows the hatch to be articulated on the cowl 147 and said hatch to be locked with said cowl 147 in the closed position.

Alternatively, the hatch is a removable hatch that is fastened by means of screws and rivet nuts.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A propulsion assembly for an aircraft, comprising:
    a propulsion system having a core enclosed in a casing, a combustion chamber, and a turbine provided with blades that rotate about a longitudinal axis,
    a nacelle in which the propulsion system is housed, comprising cowls including a front cowl extending to a front of the turbine, with a window passing through the front cowl that is disposed at a front of the turbine, and a rear cowl extending to a rear of the turbine,
    a fire barrier that extends between the front cowl and the rear cowl,
    a supply pipe configured to convey dihydrogen, meandering inside the rear cowl as far as the rear of the turbine, then in a sealed manner through the fire barrier so as to reach the outside of the front cowl, then through said window as far as the combustion chamber, wherein the supply pipe comprises a plurality of sections that are fastened to one another and wherein an intermediate section extends from downstream of the fire barrier to downstream of the window, and
    a plate fastened in a sealed manner to the intermediate section and fastened to the front cowl so as to seal said window.

2. The propulsion assembly as claimed in claim 1, wherein the fire barrier extends transversely with respect to the longitudinal axis of the propulsion system.

3. The propulsion assembly as claimed in claim 2, wherein the fire barrier extends inside the front cowl and separates the nacelle into a front zone and a rear zone that are sealed with respect to one another.

4. The propulsion assembly as claimed in claim 1, which has an outer cowl fastened to the outside of the front cowl of the nacelle, surrounding a part of the supply pipe that is between the fire barrier and the window, and
    wherein the propulsion assembly has an air inlet at the front of the outer cowl, between the outer cowl and the front cowl of the nacelle, and an outlet at the rear of the outer cowl, between the outer cowl and the cowls of the nacelle.

5. The propulsion assembly as claimed in claim 4, wherein the outlet is in front of said fire barrier.

6. The propulsion assembly as claimed in claim 4, wherein the outlet is located at a top part of the outer cowl.

7. The propulsion assembly as claimed in claim 3, further comprising:
    a sealed flange having a shoe secured to the fire barrier and a first seat forming a half-cylinder and an extension having a second seat forming a half-cylinder,
    securing means configured to fasten the extension to the shoe such that the first and second seats adjoin one another so as to form a cylinder, and
    a cylindrical seal housed in said cylinder and through which the supply pipe passes.

8. The propulsion assembly as claimed in claim 1, further comprising:
    a hatch removably mounted on a cowl.

9. An aircraft comprising:
    a dihydrogen tank and
    at least one propulsion assembly as claimed in claim 1, wherein the supply pipe is fluidically connected to the dihydrogen tank.

* * * * *